July 9, 1963

H. GANNAWAY 3,096,555

CLAMP FOR RADIALLY SPLIT RING PALLET

Filed Oct. 19, 1961

INVENTOR.
HARREL GANNAWAY.
BY
Willard S. Groen
ATTORNEY.

3,096,555
CLAMP FOR RADIALLY SPLIT RING PALLET
Harrel Gannaway, 3440 N. 27th Ave., Phoenix, Ariz.
Filed Oct. 19, 1961, Ser. No. 146,113
1 Claim. (Cl. 25—1)

This invention pertains to improvements in apparatus for making concrete pipe and is particularly directed to an improved ring pallet for use in concrete pipe making machines.

One of the objects of this invention is to provide a ring pallet for forming the male end and gasket groove in a concrete pipe which is easily assembled and then dissembled after the pipe has been cast and cured.

Another object of this invention is to provide a ring pallet for forming the male end and gasket groove in concrete in a highly efficient manner while at the same time producing a sharp clean gasket groove in the finished pipe.

And a further object of this invention is to provide a ring pallet for making concrete pipe in which the gasket groove forming ring is a permanent integral part of the ring pallet.

Further features and advantages of this invention will appear from a detailed description of the drawings in which.

Figure 1:
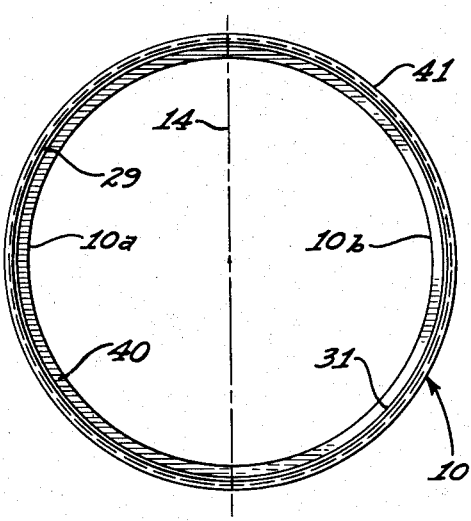
FIG. 1 is a plan view of a ring pallet for making concrete pipe incorporating the features of this invention.
Figure 2:
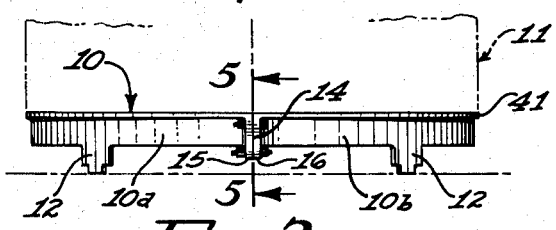
FIG. 2 is a side elevation of the ring pallet shown in FIG. 1.
Figure 3:
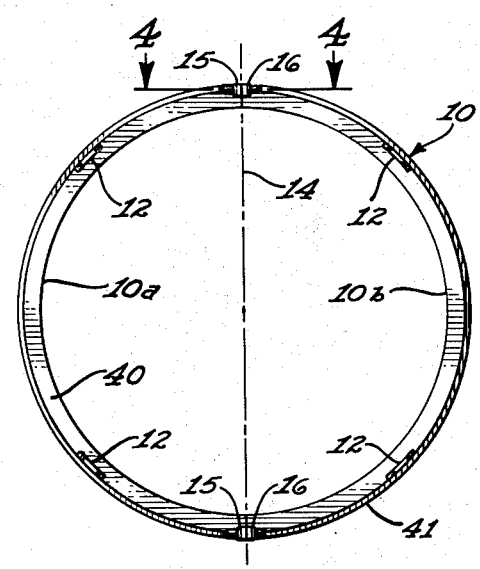
FIG. 3 is a bottom view of the ring pallet shown in FIGS. 1 and 2.
Figure 4:
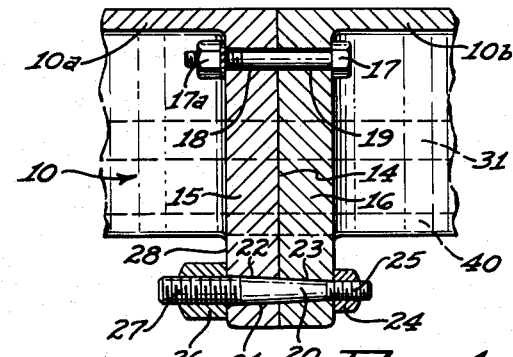
FIG. 4 is an enlarged fragmentary section on the line 4—4 of FIG. 3.
Figure 5:
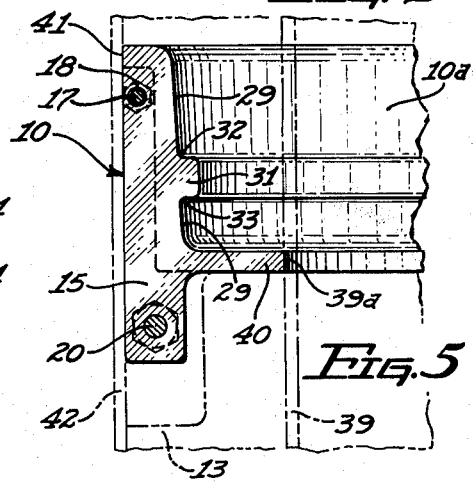
FIG. 5 is a view partly in section on the parting line 5—5 of the ring pallet.

As an example of one embodiment of this invention there is shown a ring pallet 10 for use in making a concrete pipe 11. The ring pallet 10 has the usual supporting legs 12 which rest on the platen 13 of the concrete pipe making machine and on the ground supporting the pipe for curing after the completion of the casting operation performed in the usual manner.

The ring pallet is split in two semi-circular halves 10a and 10b on a diametrical parting line 14. Lug portions 15 on portion 10a and 16 on portion 10b are held in abutting contact on the parting line 14 by the clamp bolt 17 and nut 17a in the clearance holes 18 and 19 in the lugs 15 and 16. A tapered alignment and clamp bolt 20 has an intermediate tapered portion 21 adapted to fit in mating tapered bores 22 and 23 formed in the lugs 15 and 16 and a nut 24 mounted on the threaded smaller end 25 of the tapered alignment and clamp bolt 20 so that when the nut 24 is tightened the tapered portion 21 is pulled firmly into the tapered bores 22 and 23 to simultaneously align and lock the two segments 10a and 10b of the ring pallet together. To release the bolt 20 from the lugs, nut 24 is loosened and removed from the threaded end 25. Back-off nut 26 mounted on the threaded end 27 of the bolt 20 is tightened against the abutment surface 28 of lug 15 to thereby pull the tapered bolt 20 from the tapered bores 22 and 23.

Figure 6:
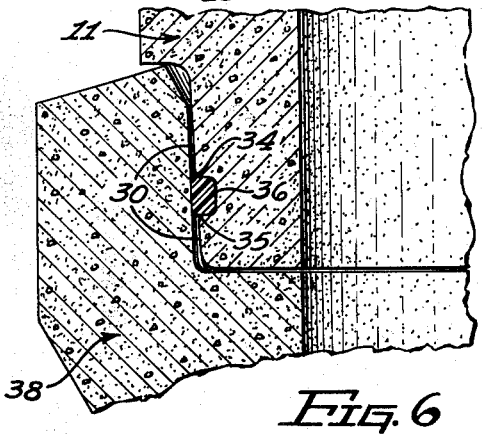
FIG. 6 is an enlarged fragmentary sectional view of the pipe joint formed by the ring pallet.

With the pallet ring segments 10a and 10b clamped together by the bolts 17 and 20 as described, the pallet ring assembly forms a perfectly circular ring having a tapered bore 29 conforming to the tapered surface 30 it is desired to form on the concrete pipe 11, FIG. 6. In the tapered bore 29 of the ring pallet 10 is formed an integral annular rib 31 merging with the bore 29 by fillets 32 and 33 so as to form well rounded edges 34 and 35 on the gasket slot 36 formed in the pipe to prevent breaking and crumbling of the slot edges to avoid leakage of the gasket 37 when the pipes 11—38 are assembled as in FIG. 6.

In casting the pipe the assembled ring pallet is placed on the platen 13 of a conventional concrete pipe making machine. The bore forming core member 39 extends up through the bore 39a formed in the bottom web 40 of the ring pallet while surrounding the outside flange 41 of the ring pallet is the outside form 42. The concrete is then fed into the top of the form assembly described in the usual manner and vibrated to compact the material between the forms 39 and 42 and into the ring pallet 10 and around the gasket slot forming rib 31. The forms 39 and 42 are then withdrawn downwardly leaving the cast pipe 11 standing upright, male end down, in the pallet ring 10. A suitable fork lift truck then picks up the ring pallet 10 and cast pipe 11 standing therein and sets the assembly down in the curing yard. As soon as the concrete has sufficiently set up, the bolts 17 and 20 are removed and the ring segments 10a and 10b removed radially from the male end of the pipe leaving a perfectly formed end and gasket groove 36.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A clamp for a radially split ring pallet comprising in combination:

(a) radially extending lug portions formed integral with the ring pallet adjacent the parting line of said ring pallet, (b) a straight clamp bolt extending through aligned clearance holes in said lug portions at right angles to the plane of split of said ring pallet, (c) a nut on said bolt adapted to be tightened to clamp the segments of the ring pallet in abutting contact at split, (d) an alignment clamp bolt, (e) an intermediate tapered portion on said alignment clamp bolt adapted to fit in mating aligned tapered bores formed in said lugs at right angles to the plane of split of said ring pallet, (f) a smaller threaded end adjacent the smaller tapered intermediate portion of said alignment clamp bolt, (g) a larger threaded end adjacent the larger tapered intermediate portion of said alignment clamp bolt, (h) a nut on said smaller threaded end engaging a lug when tightened to draw said alignment bolt into said tapered bores to align and lock said lugs in abutting contact at said split, (i) and a further nut on said larger threaded end engaging an opposite lug when tightened to withdraw said alignment clamp bolt from said tapered bore so as to release said lugs from clamped abutting engagement at said split.

References Cited in the file of this patent

UNITED STATES PATENTS

| | | |
|---|---|---|
| 680,273 | Parker | Aug. 13, 1901 |
| 749,413 | Warwick | Jan. 12, 1904 |
| 2,270,448 | Juhl | Jan. 20, 1942 |
| 2,356,852 | Hutchinson | Aug. 29, 1944 |
| 2,597,934 | Kennison | May 27, 1952 |
| 2,823,439 | Schmidgall | Feb. 18, 1958 |
| 2,848,798 | Davis | Aug. 26, 1958 |
| 2,863,205 | Seaman et al. | Dec. 9, 1958 |
| 2,865,078 | Hasselblad | Dec. 23, 1958 |

FOREIGN PATENTS

| | | |
|---|---|---|
| 867,516 | Great Britain | May 10, 1961 |